(12) United States Patent
Obert

(10) Patent No.: US 7,016,808 B2
(45) Date of Patent: Mar. 21, 2006

(54) ANALYZING AND SERVICING IMAGING DEVICES

(75) Inventor: James E. Obert, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 50 days.

(21) Appl. No.: 10/700,099

(22) Filed: Nov. 3, 2003

(65) Prior Publication Data

US 2005/0114486 A1 May 26, 2005

(51) Int. Cl.
*G21C 17/00* (2006.01)
*G06F 17/18* (2006.01)
*G06F 15/00* (2006.01)

(52) U.S. Cl. .................... 702/184; 702/181; 702/189

(58) Field of Classification Search ........ 702/182–185, 702/188, 189; 382/112, 173
See application file for complete search history.

(56) References Cited

U.S. PATENT DOCUMENTS

| | | | |
|---|---|---|---|
| 6,571,285 B1 * | 5/2003 | Groath et al. ............... | 709/223 |
| 6,915,528 B1 * | 7/2005 | McKenna, Jr. ............... | 725/37 |
| 2001/0047322 A1 * | 11/2001 | Plate et al. .................... | 705/37 |
| 2002/0188562 A1 * | 12/2002 | Igarashi et al. ............... | 705/40 |
| 2003/0107597 A1 * | 6/2003 | Jameson ..................... | 345/762 |

* cited by examiner

Primary Examiner—Michael Nghiem

(57) ABSTRACT

According to a particular embodiment, a method of analyzing and servicing an imaging device involves receiving data from the imaging device; determining whether the received data matches existing data; upon determining that the received data matches the existing data, selecting an action to be taken that correlates with the matched existing data; and adding the received data to the existing data.

24 Claims, 7 Drawing Sheets

| PRINTER X ||| 
|---|---|---|
| QUANTIFIER RANGE | MATCHING CONDITION | MATCHING ACTION |
| RANGE 1 (E.G. 100-125) | FUSER FAILURE | REPLACE FUSER |
| RANGE 2 (E.G. 100-150) | DRUM FAILURE | REPLACE DRUM |
| RANGE 3 (E.G. 180-196) | CHANGE IN MAGENTA TONER LIFE | CHANGE TONER CARTRIDGE |
| RANGE 4 | NORMAL OPERATION | NONE |
| * * * | * * * | * * * |
| RANGE N (E.G. 598-535) | PAPER JAM AT STATION 3 | REMOVE PAPER FROM STATION 3 |

FIG.4

ANALYZING AND SERVICING IMAGING DEVICES

BACKGROUND OF THE INVENTION

Imaging devices are devices that are able either to replicate or to author images. Such devices include printers, plotters, scanners, copiers, etc. Imaging devices have a means for storing information regarding attributes of the devices. Such information includes configuration settings, fault occurrences, usage history, levels of consumables (e.g. ink or toner), paper jams, firmware errors, hardware malfunctions, etc. This information is stored in "object identifiers" ("OIDs") within a "management information base" ("MIB") within each imaging device. The MIB comprises a computer memory within the imaging device. The OIDs each comprise one or more bytes of data and correspond to the status or condition of the device attributes.

The computer memory of the imaging devices can be accessed externally by other devices, such as computer systems either connected directly to the imaging devices via a cable (e.g. a parallel port cable, a universal serial bus cable, etc.) or connected remotely to the imaging devices via a network (e.g. a local area network, a wide area network, the Internet, etc.). Thus, the MIB of each imaging device can be electronically interrogated to discover or read the stored information concerning the imaging device attributes.

For a given imaging device, if it is known which device attribute corresponds to each OID, then a complete status or condition of the imaging device can be formulated by reading the OIDs from the MIB of the imaging device. Therefore, if a problem occurs in the imaging device, the problem can be diagnosed by reading the MIB data from the imaging device and analyzing the received data for a match with existing data. An appropriate solution to the problem can then be implemented, such as ordering a service call to the imaging device to refill consumables, replace defective components, etc.

The ability to analyze the MIB data to determine the condition of the imaging device requires exact knowledge of the MIB structure of the imaging device. In other words, the meaning of each OID within the MIB must be known. Therefore, when an imaging device is encountered for which the MIB structure is not completely known, the MIB must first be deciphered. The imaging device with "unknown" MIB portions may be encountered, for example, in a situation in which a servicing contract between two parties obligates one of the parties to service the other party's imaging devices, regardless of the manufacturer of the imaging devices. Most imaging device manufacturers make at least some of the OIDs, such as those specifying the vendor and model of the imaging device, publicly available. To discover other OIDs in the MIB, the imaging device is subjected, within a laboratory setting, to a wide variety of conditions or situations related to the device attributes. The MIB is read and analyzed for each situation. For example, if the imaging device is a printer, then the printer can be subjected to different situations in which paper has been inserted therein and removed therefrom. Any differences in any of the OIDs under the different situations indicate the OIDs that are related to the presence and absence of the paper.

After extensive trial-and-error testing of the imaging device, the OIDs related to the tested attributes are identified. This information is used to diagnose problems or record the status of imaging devices of the same type used outside the laboratory in real-world situations. Without this information, when presented with a malfunctioning imaging device, a service technician or a call center agent would have to iterate through several possible solutions until the imaging device worked. The testing procedure to decipher the MIB and its OIDs, however, is very time-consuming, labor-intensive and costly. Additionally, the testing procedure must be repeated for every available imaging device, of which there are hundreds currently on the market.

SUMMARY OF THE INVENTION

According to a particular embodiment of the present invention, a method of analyzing and servicing an imaging device comprises receiving data from the imaging device; determining whether the received data matches existing data; upon determining that the received data matches the existing data, selecting an action to be taken that correlates with the matched existing data; and adding the received data to the existing data.

According to another embodiment of the present invention, a method of analyzing and servicing imaging devices comprises, for each imaging device of at least a portion of the imaging devices, periodically reading object identifiers from the imaging device, calculating a quantifier value from the object identifiers and recording the quantifier value; and for at least one of the imaging devices: taking action in response to a condition of the imaging device; recording the condition and the action taken; and correlating the condition and action taken with a most recent quantifier value for the imaging device recorded prior to taking the action.

Additionally, according to yet another embodiment, an imaging device service system comprises an object identifier data input, a quantifier value calculator, a database, a quantifier value comparator and a workflow action initiator. The quantifier value calculator is connected to the object identifier data input to receive object identifier data from which a quantifier value is calculated. The database stores quantifier data and action data. The quantifier value comparator is connected to the quantifier value calculator to receive the quantifier value and to the database to receive the quantifier data. The quantifier value comparator compares the quantifier value with the quantifier data and generates a comparison result. The workflow action initiator is connected to the quantifier value comparator to receive the comparison result and to the database to receive the action data. The workflow action initiator initiates a workflow action according to the comparison result and the action data.

BRIEF DESCRIPTION OF THE DRAWINGS

FIG. 4 is an embodiment of a table of a portion of an embodiment of a database incorporated in the imaging device service center shown in FIG. 3.

DETAILED DESCRIPTION

Figure 1:
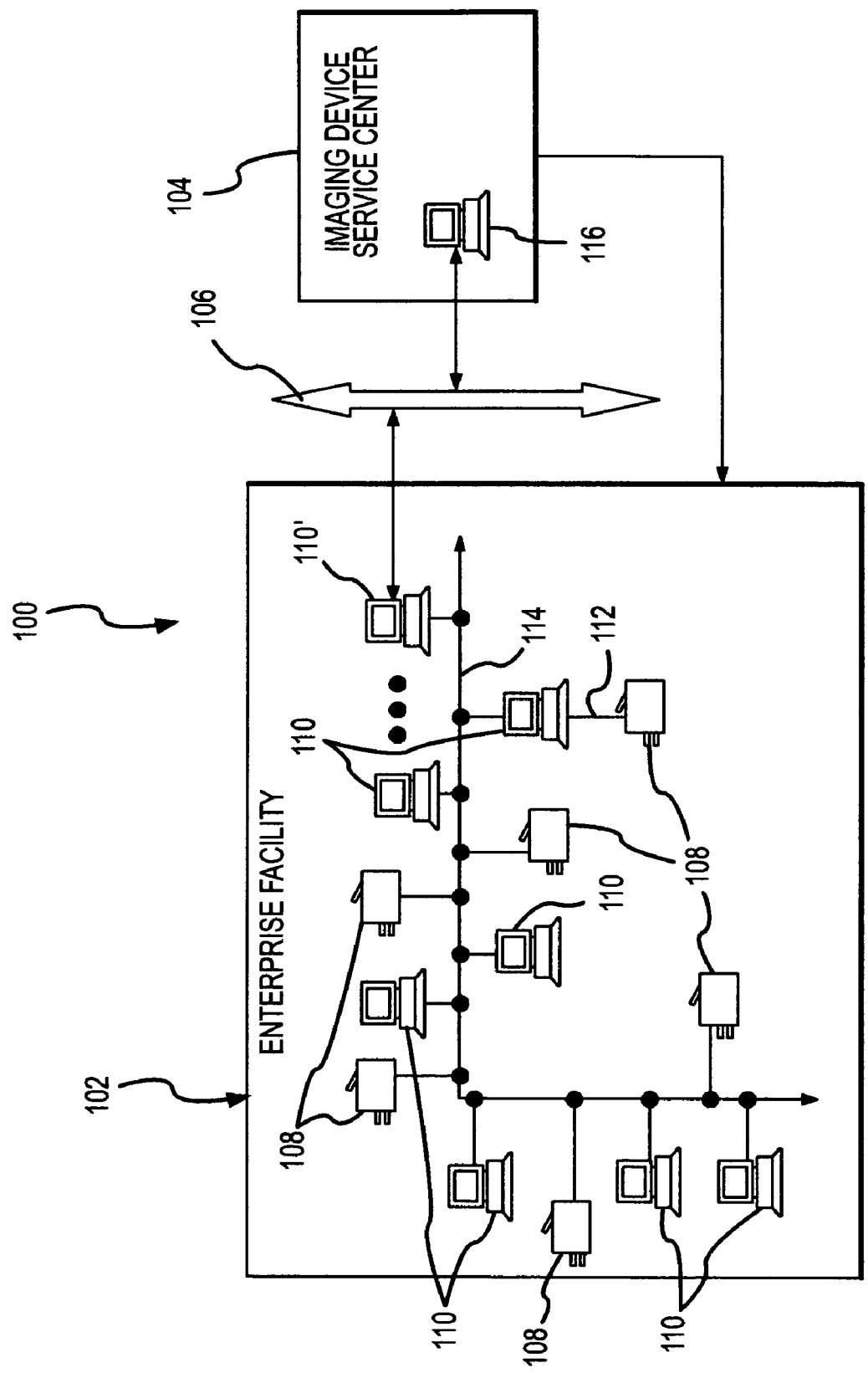
FIG. 1 is a block diagram of an imaging device service system incorporating an embodiment of the present invention.

An imaging device service system 100 ("service system") generally includes an enterprise facility 102 and an imaging device service center 104 ("service center"), as shown in FIG. 1. The enterprise facility 102 and the service center 104 are connected via a network 106, such as a wide area network, a phone line, the Internet, etc., so that the service center 104 can receive imaging device data from the enterprise facility, as described below.

The enterprise facility 102 generally includes several imaging devices 108 and computers 110 connected either directly together (e.g. at 112) or by another network 114, such as a local area network, a Fibre Channel network, etc. The imaging devices 108 generally include any device that is able to replicate, or author images, such as printers, plotters, scanners, copiers, etc. The computers 110 generally include personal computers, workstations, mini computers, mainframe computers, etc. The imaging devices 108 generally serve any imaging requirements of the computers 110. For example, among other imaging functions, the imaging devices 108 may print or scan documents for the computers 110.

Although an embodiment of the invention is described with reference to the enterprise facility 102 having multiple imaging devices 108 and multiple computers 110, it is understood that the invention is not so limited. Rather, the invention may be used in any situation having any number of imaging devices 108 and computers 110, even one of each.

The service center 104 generally includes at least one computer 116. As described below, the computer 116 receives and analyzes the imaging device data and determines servicing requirements for the imaging devices 108. The service center 104, thus, coordinates imaging device servicing operations for the enterprise facility 102, typically under a servicing contract between an owner of the enterprise facility 102 and an owner of the service center 104.

At least one of the computers 110 in the enterprise facility 102 serves as a "service appliance" 110'. The service appliance 110' connects to the computer 116 in the service center 104 via the network 106. The service appliance 110' gathers the imaging device data from the imaging devices 108 and sends the imaging device data to the computer 116.

The imaging device data gathered by the service appliance 110' includes at least a portion, if not all, of the management information bas ("MIB") of each imaging device 108. To gather the imaging device data, therefore, the service appliance 110' periodically reads the object identifiers ("OIDs") from the MIB of each imaging device 108. The data read comprises the imaging device data.

For an imaging device 108 for which the structure of the MIB is known, each OID can be specifically addressed as needed. The service appliance 110' sends read messages to IP addresses according to a communication protocol (e.g. SNMP, IEEE 1284, Firewire, parallel port standards, Universal Serial Bus, etc.) requesting the data from each desired OID. For an imaging device 108 for which the MIB structure is unknown or only partially known, the service appliance 110' preferably reads all of the OIDs, instead of only selected ones.

Figure 2:
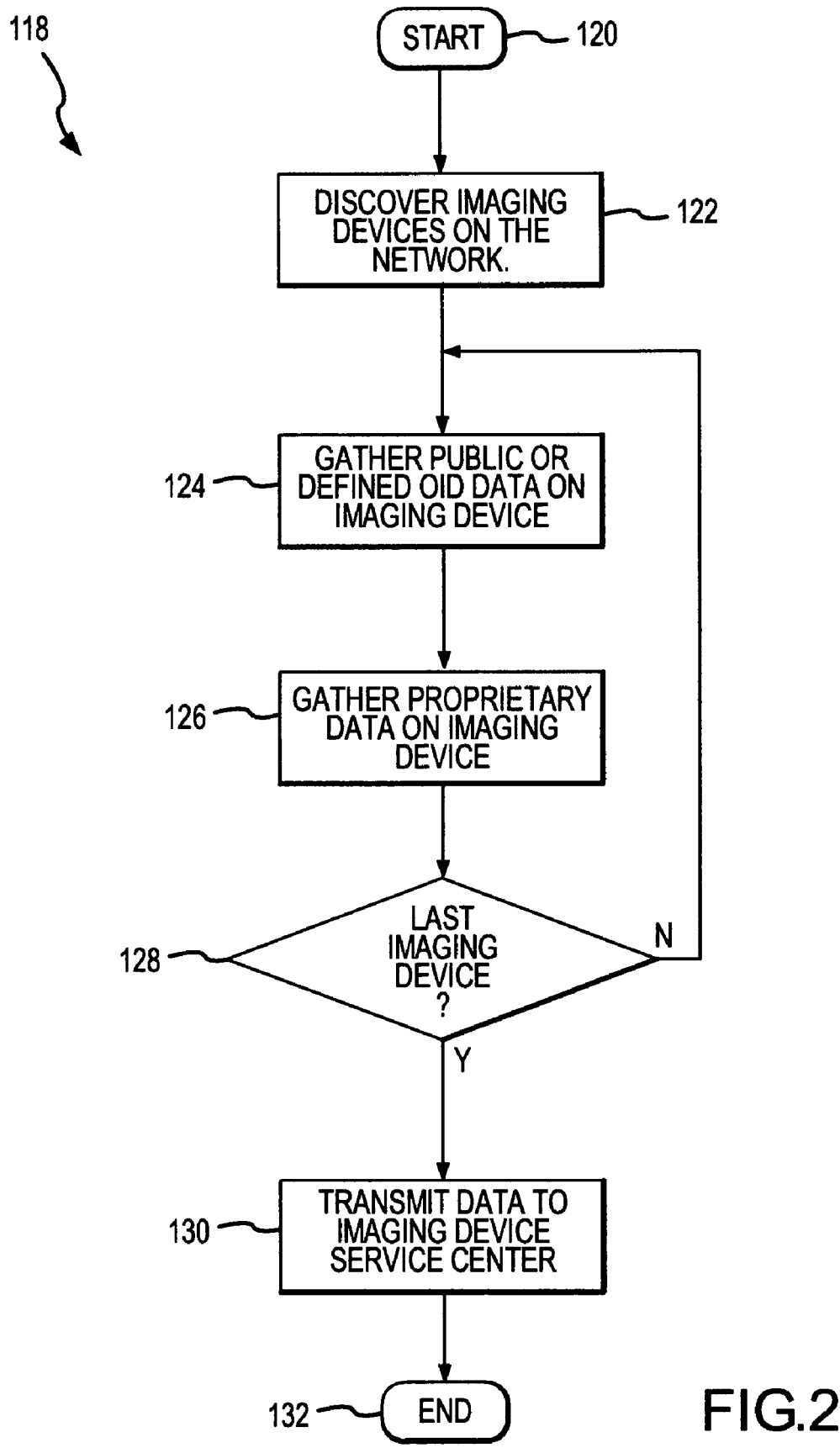
FIG. 2 is a flow chart of an embodiment of a procedure for acquiring imaging device data from an enterprise facility incorporated in the imaging device service system shown in FIG. 1.

An exemplary procedure 118 for the service appliance 110' to acquire the imaging device data from the imaging devices 108 in the enterprise facility 102 is shown in FIG. 2. Upon starting (at 120), the imaging devices 108 on the network 114 are "discovered" (at 122). Some of the imaging devices 108 may already be known to the service appliance 110'. In which case, it is preferable to poll the known imaging devices 108 to determine whether they are still active or still connected to the network 114 at a given network address. For those imaging devices 108 that are not known to be on the network 114, the service appliance 110' preferably polls all network nodes to determine which network nodes have imaging devices 108 connected thereto. Alternatively, the service appliance 110' may also "snoop" network communications for any communications directed to unknown imaging devices 108, thereby discovering these imaging devices 108 when they are used. The service appliance 110' may also preferably periodically repeat this discovery action to determine whether any imaging devices 108 have been added to or removed from the network 114.

For each imaging device 108, any OIDs that are public or otherwise already known or defined within the service system 100 are preferably read (at 124) to acquire imaging device data for which the meaning is known. This data can be used to diagnose specific conditions or problems for the imaging devices 108. The remaining data is generally proprietary to the imaging device manufacturer and is read (at 126) generally without regard to specific OIDs. Since the MIB structure is at least partially unknown, the service appliance 110' preferably uses "get next" and "get block" commands, such as are available under the SNMP protocol, to acquire unknown succeeding portions of the data. These commands do not require an exact knowledge of whatever data structure is employed in the MIB, since the imaging device 108 will respond by merely returning the next portion of the data in the memory of the imaging device 108. The service appliance 110' ends the proprietary data gathering (at 126) preferably after no additional data is returned by a target imaging device 108 in response to such commands. In other words, the imaging device 108 eventually responds that there isn't anything "next." This technique for data gathering is commonly referred to as "MIB walking," since the data is accessed by "stepping" through the MIB structure.

The data in the MIB is stored in a type of "tree" structure having a variety of levels. Each level of the MIB tree "branches" out from a higher level of the MIB tree. The highest level is generally referred to as the "root" and is typically designated by OID 1. The root of the MIB typically identifies the type of the imaging device, such as a printer, a scanner, a copier, etc. The next level in the MIB tree typically branches out to include more than one OID that refer generally to categories of various portions of the imaging device 108. For a printer, such OIDs may refer to accessories (e.g. OID 1.0), paper (e.g. OID 1.1), ink (e.g. OID 1.2), other consumables (e.g. OID 1.4), etc.

The OIDs may not be numbered consecutively, and each branch of the MIB tree may not have the same number of levels. The MIB walking technique, however, manages to obtain all of the imaging device data without such knowledge regarding the MIB structure of the imaging devices 108. By "walking" through the MIB tree, each of the OIDs is read and the data obtained.

Many of the lowest level OIDs in the branches of the MIB tree relate to specific sensors within the imaging device 108. Such sensors may detect, for example, an empty paper tray, an empty magenta toner cartridge, an open compartment panel, etc. The related OIDs, thus, indicate the state of the sensors, and thereby, various conditions of the imaging device 108.

The MIB walking technique, however, is generally performed without regard to the meaning of any of the OIDs. In the prior art, described above, only those OIDs for which the meaning was known were read, since unknown OIDs were of no use. It was thus necessary to know the tree structure to read specific OIDs. In the present case, on the other hand, it is preferable to read the entire MIB indiscriminately, since it may not be known which OIDs are relevant to any given situation.

The data gathering (at 124 and 126) is repeated for each imaging device 108 until the data for the last imaging device 108, as determined at 128, has been acquired. The data thus obtained is transferred (at 130) by the service appliance 110' to the computer 116 at the service center 104. The data acquisition procedure 118 either ends (at 132) or repeats periodically.

An alternative, which can be done instead of or in addition to the MIB walking technique described for the data acquisition procedure 118, is to monitor network traffic with a "sniffer." The sniffer (e.g. one of the computers 110, preferably the service appliance 110') unobtrusively reads messages that are sent over the network 114. In this case, the sniffer is monitoring the messages for communications related to the imaging devices 108. Of particular interest are messages from the imaging devices 108, since most imaging devices 108 are capable of responding to a requested imaging function, such as a print job, with various types of error messages, such as an "out-of-paper" or "out-of-toner" message. A utility (provided by the manufacturer of the imaging device 108 and operating on the computer 110 that requested the imaging function) receives the error message and typically alerts a user to the problem encountered. The user may be able to remedy the problem, such as by adding paper to the imaging device 108 or changing a toner cartridge therein. In many instances, however, it may not be the user's job to service or repair any of the imaging devices 108. Instead, it is typically the responsibility of the service center 104 to alert a service technician to service and repair the imaging devices 108. The sniffer, therefore, causes the service appliance 110' to send to the computer 116 part or all of the message that was generated by the imaging device 108. The computer 116 preferably handles, or analyzes, this message in a manner similar to that with which it handles the imaging device data, as described below, to diagnose any problems with the imaging devices 108 that need servicing.

Although it is preferable to discover any imaging device problems through periodic reading of the MIB before any requested imaging device functions are affected, it is not always possible or practical to do so. The "sniffer technique," therefore, enables the problem to be discovered soon after it affects a requested imaging device function.

The service system 100 has the ability to incorporate the trial-and-error testing procedure described in the background without the need for a laboratory setting, particularly when the sniffer technique is employed. In this case, one or more of the imaging devices 108 within the enterprise facility 102 may be intentionally subjected to various conditions resulting in messages being sent from the imaging devices 108 upon encountering an imaging device function that cannot be processed. The sniffer will automatically pass the messages on to the computer 116 for analysis, the results of which can be correlated with the conditions to which the imaging devices 108 were intentionally subjected.

Figure 3:
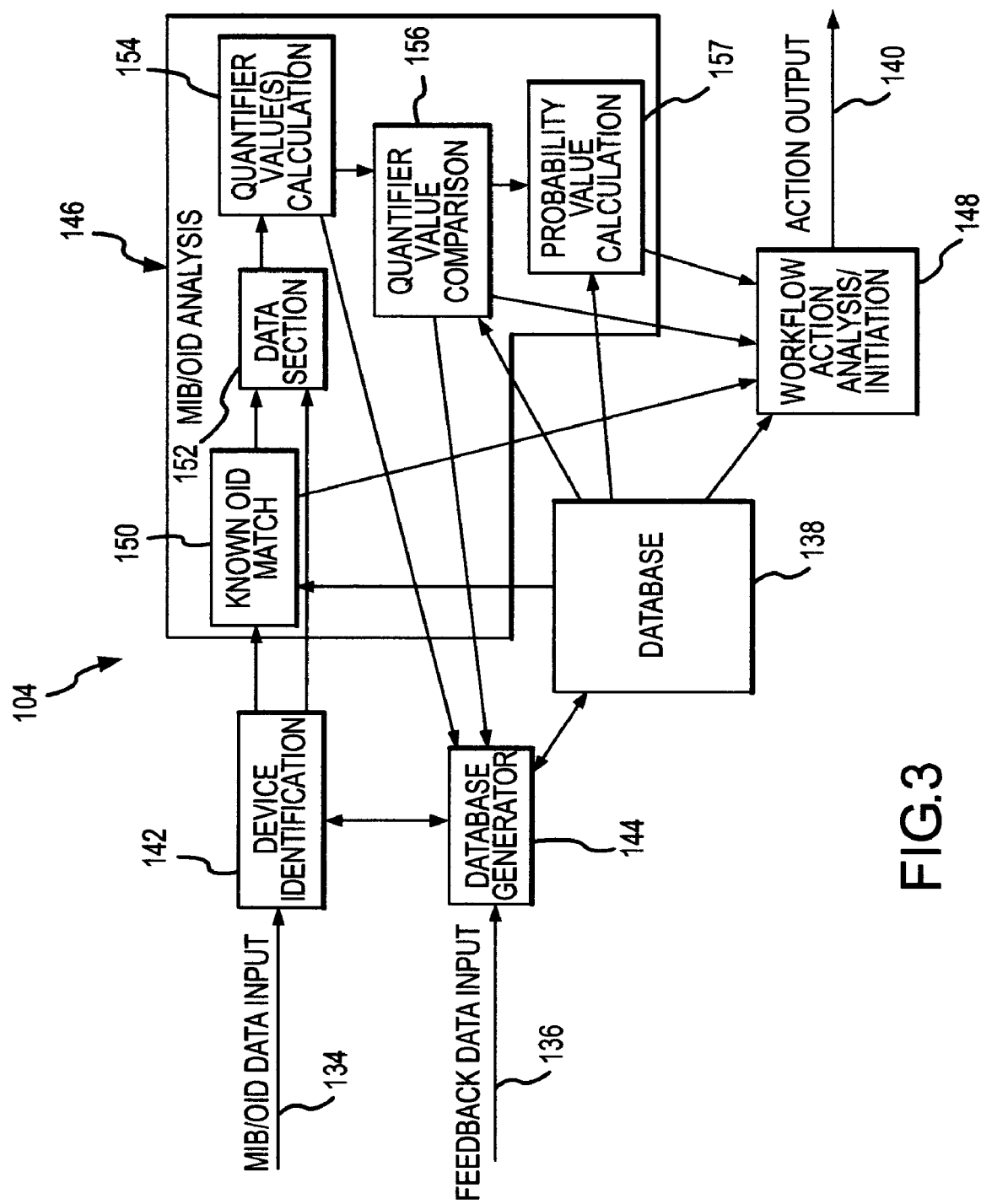
FIG. 3 is a functional block diagram of an embodiment of an imaging device service center incorporated in the imaging device service system shown in FIG. 1.

The service center 104 performs a variety of functions, as illustrated by functional blocks shown in FIG. 3, operating on the computer 116 (FIG. 1). Generally, the service center 104 receives the imaging device data (at MIB/OID Data Input 134) and condition/action feedback data (at Feedback Data Input 136) and analyzes this data to build a database 138 of imaging device data correlated with feedback data. The feedback data generally comprises the conditions that some of the imaging devices 108 have been subjected to, either intentionally during device testing or unintentionally during a normal course of operation of the imaging devices 108, and the actions taken to correct the conditions. The feedback data may preferably be generated by service technicians who have serviced the imaging devices 108 and reported the problems and solutions they have encountered in the field. Additionally, the service center 104 receives the imaging device data (at MIB/OID Data Input 134) and analyzes this data in combination with the database 138 of previously generated imaging device data and correlated condition/action feedback data to generate action orders (at Action Output 140) for servicing the imaging devices 108.

The functional blocks shown are exemplary only. Therefore, the general analyzing and servicing functions of the service system 100 (FIG. 1) may be implemented in any appropriate manner to perform part or all of the functions described with reference to the functional blocks.

Generally, the service center 104 preferably includes a device identification functional block ("device identifier") 142, a database generator functional block ("database generator") 144, a MIB/OID Analysis functional block ("MIB analyzer") 146 and a workflow action analysis/initiation functional block ("workflow action initiator") 148. The device identifier 142 generally receives the imaging device data (at 134) and attempts to identify the "type" of imaging device 108 from which the imaging device data was read. The database generator 144 generally uses the imaging device data, the feedback data and the results of calculations and analyses performed within the service center 104 to generate the database 138. The MIB analyzer 146 generally calculates "quantifier values" (described below) from the imaging device data and analyses the imaging device data and the quantifier values in combination with data read from the database 138. The workflow action initiator 148 generally determines an action to be taken in response to the results of the analyses performed by the MIB analyzer 146 and in accordance with data read from the database 138.

The device identifier 142 generally attempts to identify the type of the imaging device 108 by searching the database 138 for a matching device type. The "type" information is usually part of the information that imaging device manufacturers make public, so this information can be entered into the database 138 manually when the first imaging device 108 of each type is placed on the network 114 (FIG. 1). The type information may also be defined in the root level of the MIB, so the type may potentially be discovered by analyzing the imaging device data without recourse to the database 138.

If the device identifier 142 cannot identify the type of imaging device 108 involved or if there is no existing entry for the type in the database 138, then the type of imaging device 108 may not have been previously encountered by the service center 104 (FIG. 1). In this case, it is likely not possible to analyze the imaging device data to generate an action order (at Action Output 140) for servicing the imaging device 108 from which the imaging device data was read. The imaging device data can, however, be used to build, or add to, the database 138 with an initial entry for a new type, but with no feedback data yet correlated therewith. The device identifier 142, thus, passes the imaging device data to the database generator 144, so the imaging device data 144 can be added to the database 138. The device identifier 142 also preferably passes the imaging device data to the MIB analyzer 146 for calculation of the quantifier values, which are also to be added to the database 138, so the quantifier values can potentially be used for future analyses.

If the device identifier 142 identifies the type of imaging device 108 involved, then the device identifier 142 passes the imaging device data and the type information to the MIB analyzer 146.

The MIB analyzer 146 generally includes a known OID match functional block ("OID matcher") 150, a data section functional block ("data sectioner") 152, a quantifier value(s) calculation functional block ("quantifier calculator") 154 and a quantifier value comparison functional block ("quantifier comparator") 156 and a probability value calculation functional block ("probability calculator") 157. The OID matcher 150 generally attempts to determine whether any data for identifiable, or known, OIDs in the imaging d vice data match any data patterns indicating a problem with, or condition of, the imaging device 108. The data sectioner 152 generally partitions, or divides, the imaging device data into appropriate sections. The quantifier calculator 154 generally calculates the one or more quantifier values from the imaging device data as a whole and/or from the sections thereof. The quantifier comparator 156 generally compares the quantifier values to previously calculated quantifier values for the same type of imaging device to potentially identify a condition of the imaging device 108. The probability calculator 157 generally determines a probability value indicating a degree of confidence in whether the identified condition of the imaging device 108 is correct.

The OID matcher 150 attempts to match the data for any known OIDs generally by using pattern-matching techniques. Thus, the OID matcher 150 accesses the device type in the database 138 to determine whether any of the OIDs for the type are known. Such OIDs are generally those that are made public by the imaging device manufacturer or that may have been identified using the trial-and-error testing procedure described above. If the type of the imaging device was not identified by the device identifier 142, then there likely cannot be an OID comparison, so the OID matcher 150 is preferably bypassed, and the imaging device data is preferably passed to the data sectioner 152. On the other hand, if the type is known and if any of the OIDs are determined to be known, then any known patterns for the OID data that may indicate particular conditions of the imaging device 108 are read from the database 138 and compared to the pattern of ones and zeros for the known OID portion of the received imaging device data. It is thus determined whether there is a match between the known pattern and the received data. If there is no match, then the imaging device data is passed to the data sectioner 152 for further processing. On the other hand, if there is a match, then the type information and the match result (and possibly also the imaging device data) are transferred to the workflow action initiator 148 to determine an appropriate response to the match. For example, it may be known that a particular pattern in a given OID for a printer indicates that the printer has a fuser that is operating too hot. If the pattern is matched in the appropriate portion of the received imaging device data, then the workflow action initiator 148 will be alerted to issue an appropriate action order to remedy this condition, such as sending a service technician to replace the fuser.

The data sectioner 152 preferably partitions the imaging device data into sections, so that the following quantifier value analysis (i.e. calculation and comparison) can be performed on the sections of the imaging device data, as well as on the imaging device data as a whole. The number of sections and the size of each preferably depend on the device type and are defined by a partitioning model for the type. The partitioning model indicates appropriate points in the imaging device data where the boundaries of the sections are to be drawn. For example, it may be known for a printer that a particular block of the imaging device data refers to various conditions related to paper and that another block is related to toner, so it may be advantageous to have the imaging device data partitioned along these blocks when performing the following quantifier value analysis. Furthermore, the quantifier value analysis can use pattern-matching techniques when there is more than one quantifier value.

The partitioning model is preferably stored in the database 138 under the device type. Thus, the data sectioner 152 preferably reads the partitioning model from the database 138 under the device type and partitions the imaging device data accordingly. If the type is not known, then there may not be a partitioning model, so the imaging device data may be passed to the quantifier calculator 154 without partitioning. Alternatively, there may be a "default" partitioning model (e.g. N almost-equal-sections) to be used when the type is not known or when no model is specified. Additionally, there may be situations in which it is not advantageous to perform the following quantifier value analysis on sections of the imaging device data, so the data sectioner 152 is preferably an optional function.

The quantifier calculator 154 quantifies the overall imaging device data and/or the sections thereof as the quantifier values according to a bit-by-bit quantification algorithm. The quantifier calculator 154 preferably converts each unit, or character, of the imaging device data or sections thereof into its hexadecimal or ASCII equivalent and sums the individual values to calculate the quantifier values. Alternatively, the quantifier values may preferably be calculated by summing the imaging device data or sections thereof on a byte-by-byte or word-by-word basis. The resulting quantifier values are generally a single byte of data or word of data of any appropriate bit length. The quantifier values are provided to the quantifier comparator 156 for analysis and to the database generator 144 for storage in the database 138.

The quantifier values are generally indicative of the conditions that may occur to the imaging devices 108 (FIG. 1), because the quantifier values are usually different for each condition. It is possible, however, for two different sets of MIB data from the same, or same type of, imaging device 108 to result in the same quantifier value. In other words, the same quantifier value may be related to two or more different conditions. Additionally, it is possible for two or more different quantifier values to relate to the same condition experienced by the same imaging device 108 at different times or by different imaging devices 108 of the same type. This situation can occur because, although the OID that relates to a particular condition is likely to be the same each time the condition occurs, one or more of the other OIDs in the MIB may be different at different occurrences of the same condition, since they may not be controlled by that condition. Therefore, the quantifier values are not necessarily absolute indicators of individual conditions.

The uncertainty in the meaning of a specific quantifier value is preferably compensated for primarily in two ways. First, specific conditions of the imaging devices 108 are allowed to be correlated with multiple quantifier values and/or ranges of quantifier values within the database 138. Second, the probability values are preferably determined based on how well the current MIB data matches previous MIB data from which the same or similar quantifier values (or within a range thereof) were calculated. Alternatively, the probability values may be associated with previously occurring quantifier values or ranges of quantifier values. The probability values preferably indicate the probability of a particular condition having occurred to one of the imaging devices 108 when a specific quantifier value equaling one of the previously occurring quantifier values or falling within one of the ranges of quantifier values has been calculated from the imaging device data read from that imaging device 108. Thus, it is not necessary to know the exact data for a particular condition for the imaging devices 108. Instead, the probability value indicates the most likely condition(s).

When it receives the quantifier values, the database generator 144 stores the quantifier values in the database 138 under the type of the imaging device 108 associated with the quantifier values as determined by the device identifier 142, as described above. The database generator 144 also uses the quantifier values as indexes for the associated imaging device data, which is also stored in the database 138 under the type of the imaging device 108. When the feedback data is received at 136, the database generator 144 generally retrieves the most recently received quantifier values from the database 138 and correlates the condition and the action taken, according to the feedback data, with the retrieved quantifier values. The database generator 144 formats this information and stores it in the database 138.

When the same condition is reported in the feedback data more than once and correlated with different quantifier values, then a range of quantifier values can be established between the quantifier values and correlated with that condition. A range can also be established as an appropriate +/−tolerance "window" surrounding one or more quantifier values. When a new quantifier value falls within the range of quantifier values, then the service center 104 (FIG. 1) can respond even though the exact quantifier value may never before have been encountered. In this manner, the service center 104 may be more responsive or reactive to the received imaging device data than it would be if it relied solely on exact matches for the quantifier values.

An example of a database entry having quantifier value ranges and correlated conditions and actions taken is shown in a table 158 in FIG. 4. The table 158 preferably forms part of the information stored in the database 138 for an exemplary imaging device 108 referred to as "Printer X." Several quantifier value ranges 160–168 have been established. The size of the quantifier value ranges 160–168 may vary. Each quantifier value range 160-168 has been correlated with a matching condition 170–178 and matching action 180–188. For some cases, a quantifier value may fall within a range (e.g. 166) matching a normal operating condition (e.g. 176) or requiring no action (e.g. 186). Some quantifier value ranges (e.g. 160 and 162) may overlap, so a calculated quantifier value may fall within both ranges 160 and 162. A higher probability value may be calculated for one of the ranges, or for different portions of the ranges or for individual quantifier values, due to the number of times one of the matching conditions 170 has occurred compared to the other matching condition 172.

When the quantifier comparator 156 receives a calculated quantifier value for an imaging device 108 of the same type as Printer X, the quantifier comparator 156 reads the information shown in table 158 from the database 138. The quantifier comparator 156 compares the quantifier value with the quantifier value ranges 160–168 to determine whether the quantifier value falls within any of the quantifier value ranges 160–168. If the quantifier value does not fall within any of the quantifier value ranges 160–168, then the quantifier value either has never before been encountered or has not yet been correlated with a condition or action. In either case, there likely is no action to be taken in response to the quantifier value. The quantifier value may also merely relate to a "normal operation" condition and not require any action. Nevertheless, the comparison result is preferably reported to the database generator 144 to track the quantifier value as "uncorrelated" until it can be correlated with a particular condition. If the quantifier value falls within, or matches, any of the quantifier value ranges 160–168, then the comparison result is reported to the workflow action initiator 148 to determine the action, if any, that needs to be taken in response to the quantifier value match. The comparison result is also reported to the probability calculator 157 in order to calculate the probability value, as described below. The comparison result is also reported to the database generator 144 to further build the database 138 to track the number of times a calculated quantifier value has matched the quantifier value ranges 160–168 and the correlated conditions 170–178. Such information, when further correlated with additional feedback data may affect the probability values.

When the probability calculator 157 receives the quantifier comparison results, the probability calculator 157 preferably reads from the database 138 previously stored imaging device data, or sections thereof, that was indexed to the matching quantifier value or quantifier value range. The probability calculator 157 preferably uses pattern recognition algorithms to determine how closely the current imaging device data matches the previously stored imaging device data. The probability value is, thus, preferably related to the closeness of this match. Alternatively, after feedback data has shown that a certain percentage of the time the imaging devices 108 (FIG. 1) have experienced a particular failure when the quantifier values have fallen within a particular quantifier value range (e.g. 160), then the probability value may be the same percentage that the imaging device 108 has had the same failure the next time the quantifier value falls within the quantifier value range 160.

The workflow action initiator 148 receives the results of any OID matches from the OID matcher 150, the results of the quantifier value comparison from the quantifier comparator 156 and the results of the probability calculation from the probability calculator 157. The workflow action initiator 148 generates at 140 an order for an appropriate action to be taken. The workflow action initiator 148 queries the database 138 for the appropriate action based on the type of the imaging device 108 and the quantifier value and OID comparison results. In the case of an OID match, the determination of the action is straightforward according to the condition indicated by the relevant OID. In the case of any quantifier value matches, the action is also relatively straightforward due to confidence that can be developed in the quantifier value analysis and the probability values.

Since an initial correlation of a condition and action with a quantifier value or range is based on only one instance, the confidence in using this information to produce an action order may be relatively low. Over time, however, as more data is generated and shows agreement, confidence increases in the probability value and in the correlation of the quantifier value with the condition and action. Therefore, there is preferably a discovery/learning phase during which the database 138 is built up while the service center 104 is operating to service the imaging devices 108. During this time, the reliability of the quantifier values to correctly identify the conditions of the imaging devices 108 is tested by having the MIB analyzer 146 perform its analysis without having the workflow action initiator 148 output any actual action orders. Instead, the results of the quantifier value analysis are compared to feedback generated by the service technicians servicing the imaging devices 108 to determine how well the analysis agrees with the actual conditions encountered and resolved by the service technicians. With each new feedback result, the quantifier value analysis is made more reliable. Eventually, confidence becomes reasonably high, and the MIB analyzer 146 may be used to issue action orders in response to the quantifier value analysis. Eventually, the database 138 will incorporate almost every possible condition and action for each imaging device 108. Significant changes in the database 138 will thus become fewer and further between, until a new imaging device 108 of a new type is added to the enterprise facility 102. The learning phase will then begin for the new imaging device type.

It may take a while to assemble all of the quantifier value data for all conditions that could occur for each type of imaging device 108. However, it is acceptable to start using the accumulated data to perform the quantifier value analysis on the imaging device data before all of the possible data has been assembled.

Figure 5:
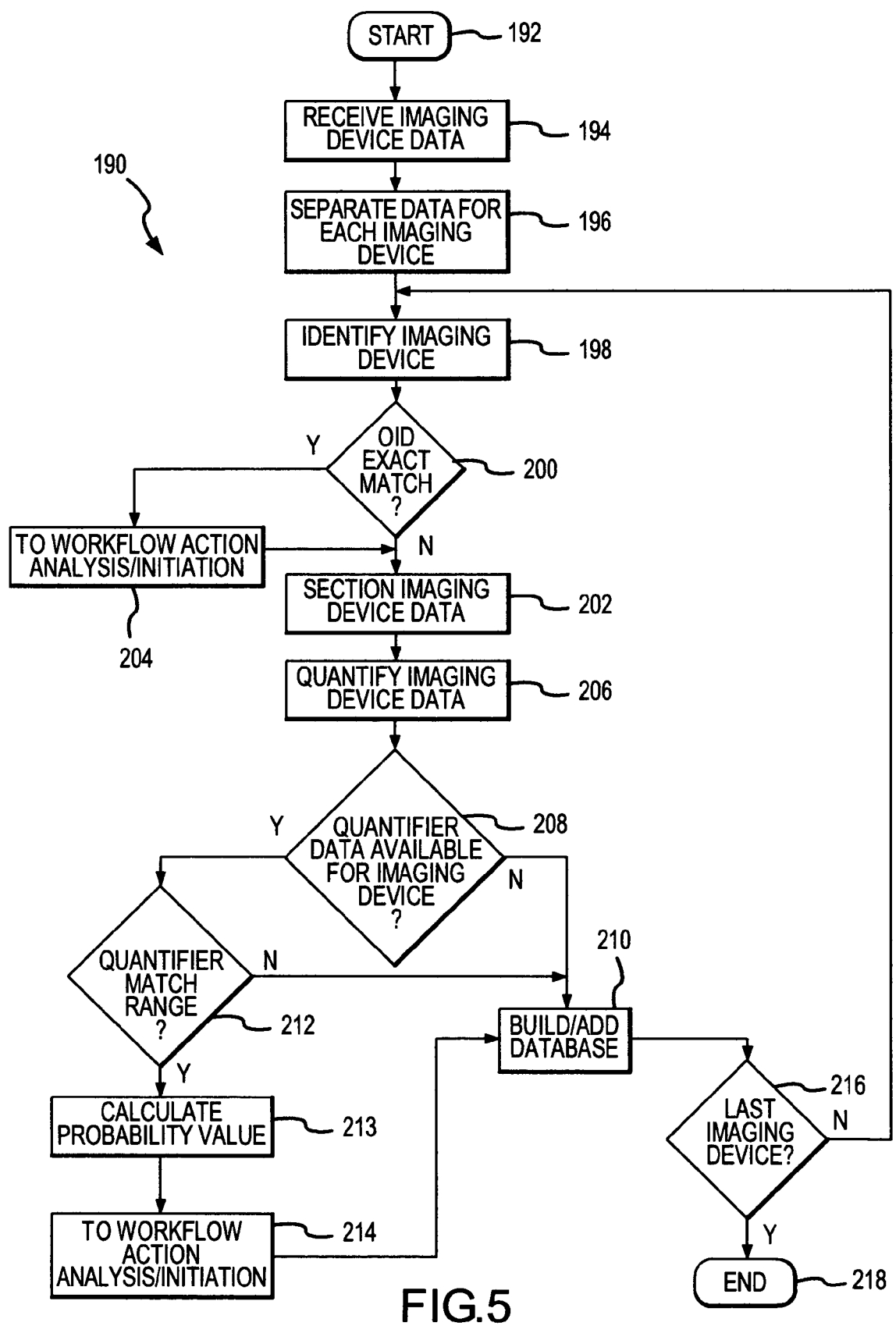
FIG. 5 is a flow chart of an embodiment of a procedure for handling the imaging device data acquired by the procedure shown in FIG. 2.

An exemplary procedure 190 for the service center 104 (FIGS. 1 and 3) to analyze the imaging device data is shown in FIG. 5. Upon starting (at 192), the service center 104 receives (at 194) a batch of imaging device data at MIB/OID Data Input 134 (FIG. 3). The imaging device data may be the MIB data from one, several or all of the imaging devices 108. If from more than one imaging device 108, the imaging device data for each imaging device 108 is separated at 196. For the first imaging device 108, the device identifier 142 (FIG. 3) identifies (at 198) the imaging device 108, or its type, as described above. At 200, the OID matcher 150 determines whether the imaging device type includes any known OIDs that have a pattern matching any corresponding portion of the imaging device data, thereby indicating a condition that may need servicing. If not, then the data sectioner 152 partitions (at 202) the imaging device data, if necessary, prior to the quantifier value calculation and analysis, described above. On the other hand, if the corresponding portion of the imaging device data matches any known OID data pattern, as determined at 200, then the match result is transferred (at 204) to the workflow action initiator 148 to determine an appropriate response to the match. Since it is possible for there to be a quantifier value match as well as an OID match indicating more than one action to take to service the imaging device 108, it is preferable to continue with the quantifier value analysis, as shown by the flow chart in FIG. 5. Thus, the workflow action initiator 148 preferably does not begin to determine the appropriate action to take until the quantifier value analysis is done, so that all possible conditions of the imaging device 108 may be taken into consideration. However, in an alternative, the quantifier value analysis may be bypassed whenever there is an OID match, thereby assuming that the OID match produces a more reliable result, but this alternative may miss any conditions that are not indicated by known OIDs.

The quantifier calculator 154 quantifies (at 206) the imaging device data by calculating the quantifier value(s), as described above, for the sections (if any) of the imaging device data and/or for the overall imaging device data. If there is not yet any quantifier value data in the database 138 (FIG. 3) for the type of the imaging device 108, as determined at 208, then the quantifier value analysis cannot be performed, but the quantifier value(s) calculated at 206 can be added (at 210) to the database 138 by transferring the quantifier value(s) to the database generator 144 (FIG. 3) for indexing to the imaging device data. On the other hand, if there is any quantifier value data available for performing the quantifier value analysis on the relevant type of imaging device 108, as determined at 208, then the quantifier comparator 156 compares (at 212) the quantifier value(s) calculated at 206 with the quantifier value data, such as the quantifier value ranges 160–168 (FIG. 4), read from the database 138. If there is no match (at 212) between the calculated quantifier value(s) and the quantifier value data, then the calculated quantifier value(s) can still be added (at 210) to the database 138 for future analyses. On the other hand, if there is a match (at 212), then the probability value is calculated at 213. The match result and probability value are transferred (at 214) to the workflow action initiator 148 to determine an appropriate response to the match. The calculated quantifier value(s) are still preferably added (at 210) to the database 138 for future analyses, but the match results at 212 may also be taken into consideration in building the database 138. It is then determined (at 216) whether the last imaging device 108 for which imaging device data was received at 194 has been processed. If not, then the procedure 190 continues with identifying the next imaging device 108 at 198 and so forth. When all of the imaging devices 108 for which imaging device data was received at 194 have been processed, as determined at 216, the procedure 190 either ends at 218, as shown, or repeats for another batch of imaging device data.

Figure 6:
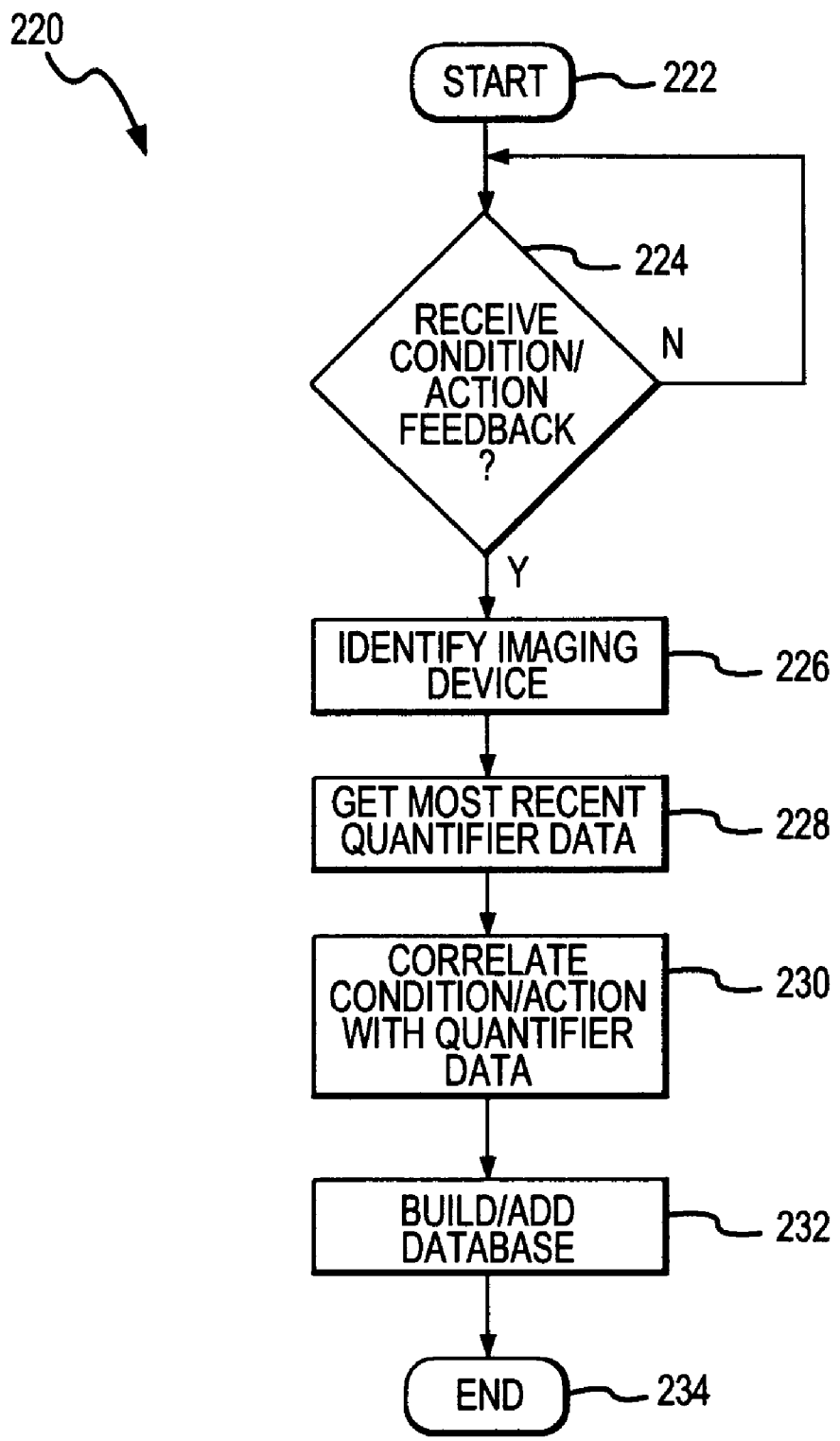
FIG. 6 is a flow chart of an embodiment of a procedure for handling feedback in the imaging device service center shown in FIG. 3.

An exemplary procedure 220 for the service center 104 (FIGS. 1 and 3) to incorporate into the database 138 the condition/action feedback data received at 136 (FIG. 3) is shown in FIG. 6. Upon starting (at 222), the service center 104 waits (at 224) until it receives the condition/action feedback data. This feedback data may include a service code reported by a service technician who serviced at least one of the imaging devices 108. The service code may indicate the condition of the imaging device 108 and the action taken to remedy the condition. The feedback data also preferably includes any appropriate identification for the imaging device 108 that was serviced. The imaging device 108 is, thus, identified at 226. Using the identification of the imaging device 108, the most recent quantifier value data for the imaging device 108 is read (at 228) from the database 138. Alternatively, if the feedback data includes "time" information reported for the occurrence of the condition, then the quantifier value data immediately preceding and/or following the time of the condition occurrence is read from the database 138. The condition and action taken are correlated (at 230) with the quantifier value data. The correlated quantifier value data, condition and action taken are added (at 232) to the database 138 under the type of imaging device. If there are previous database entries for the same or similar condition and or action taken correlated with previous quantifier value data, then the quantifier value data for the current feedback data is combined with the previous quantifier value data to further build (at 232) the database 138 by forming or adjusting the relevant quantifier value ranges (e.g. 160–168, FIG. 4) for the condition and action taken and by adjusting the probability values associated therewith. The procedure 220 either ends (at 234), as shown, or returns to wait for the next feedback data at 224.

Figure 7:
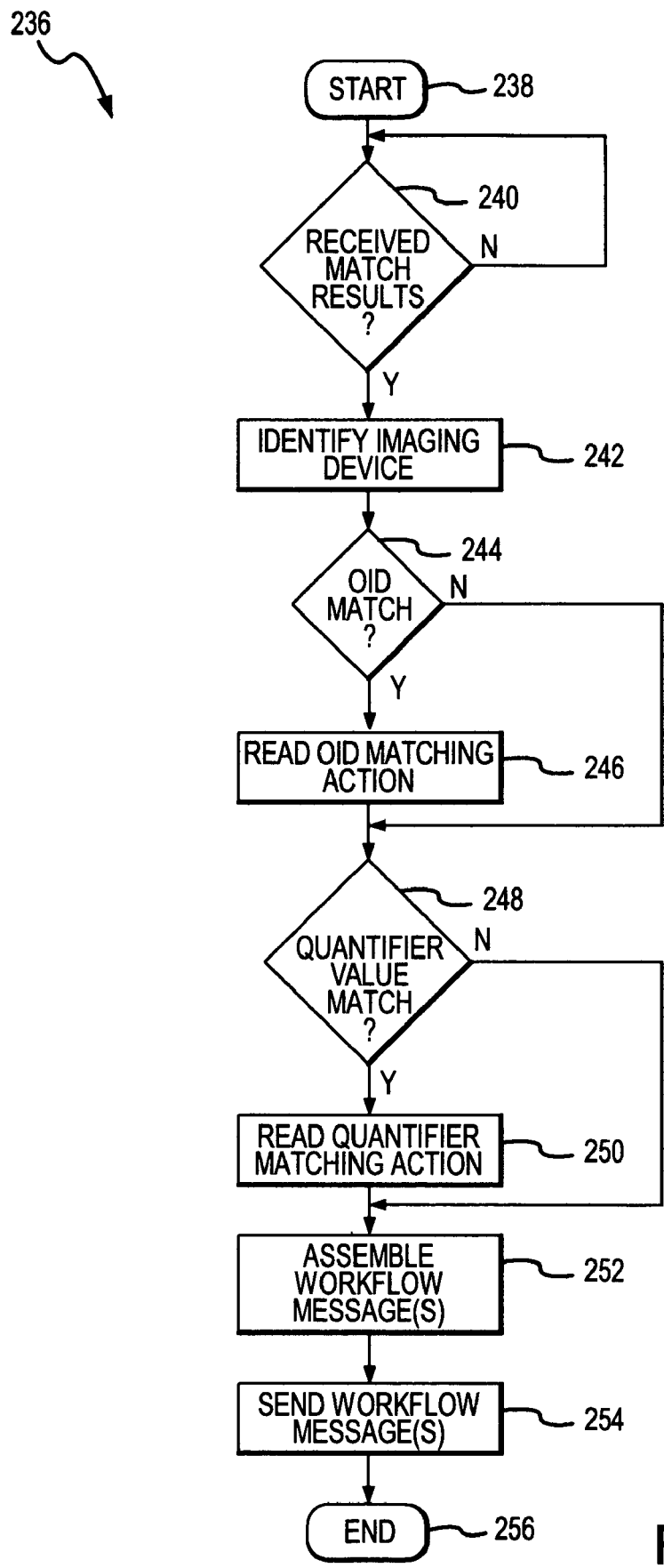
FIG. 7 is a flow chart of an embodiment of a procedure for generating an action order in the imaging device service center shown in FIG. 3.

An exemplary procedure 236 for the workflow action initiator 148 (FIG. 3) to generate the action orders at the Action Output 140 is shown in FIG. 7. Upon starting (at 238), the procedure 236 waits (at 240) until it has received all of the match results from both the OID matcher 150 and the quantifier comparator 156. Alternatively, the MIB analyzer 146 retains the match results until all of the match results have been assembled and then transfers all of the match results at once to the workflow action initiator 148. The imaging device 108 is identified at 242, so the workflow action initiator 148 will be able to read the appropriate action data from the database 138. If there is an OID match, as determined at 244, then the corresponding action to be taken is read (at 246) from the database 138. If there is a quantifier value match, as determined at 248, then the corresponding action to be taken (e.g. 180–188, FIG. 4) is read (at 250) from the database 138. One or more "workflow messages" are assembled at 252. The workflow messages indicate the action(s) to be taken to remedy the condition(s) of the imaging device 108. For example, if the imaging device 108 needs a fuser replacement, then one workflow message may be sent (at 254) to a fuser supplier with an action order for sending a new fuser for the imaging device 108, and another workflow message may be sent (at 254) to a service technician to schedule a service trip to the enterprise facility 102 to coincide with the arrival of the new fuser. The procedure 236 either ends at 256, as shown, or repeats.

The quantifier values and the associated probability values enable the service center 104 to analyze relatively large MIBs for many imaging devices 108 and build the database 138 "on the fly." In other words, instead of having to perform an exhaustive laboratory analysis to discover the complete description of the MIB structure and the meaning of each of the OIDs for each imaging device 108 before making use of this information, the service center 104 can begin service operations by responding to service calls from the enterprise facility 102 (FIG. 1) while building the database 138. The service center 104, thus, avoids high start-up costs associated with prior art service centers. Additionally, although the service technicians may initially have to take extra time to service some of the imaging devices 108, the average service time and the number of service trips to th enterprise facility 102 are eventually reduced significantly, since the quantifier value analysis becomes more reliable over time. Thus, as the database 138 continues to be built, the service center 104 will be able to respond more quickly and efficiently with a solution for a problem, and more information regarding the problem and solution will be provided to the service technician. Additionally, the quantifier values may become "predictive" of conditions that may soon cause a problem in the imaging devices 108. Thus, the service center 104 may respond before a problem manifests.

The laboratory trial-and-error testing technique of the prior art is artificial, has limited resources, cannot adequately simulate real-world conditions and is not guaranteed to find every possible condition. The service center 104, on the other hand, benefits from having many devices within the enterprise facility 102 and from the random combination of events that occur naturally during normal operations. The service center 104 receives data spontaneously and in large numbers. Sounder data, better average results and a better chance of having the results relate to the real world are thus obtained.

The invention claimed is:

1. A method of analyzing and servicing an imaging device comprising:
    receiving data from the imaging device;
    converting the received data into a quantifier value;
    determining whether the received data matches existing data by determining whether the quantifier value matches the existing data;
    upon determining that the received data matches the existing data, selecting an action to be taken that correlates with the matched existing data;
    adding the received data to the existing data; and
    calculating a probability value indicating a degree of confidence that the selected action to be taken is a correct action to be taken.

2. A method as defined in claim 1 wherein:
    the existing data comprises a plurality of quantifier value ranges; and
    the determining step comprises determining whether the quantifier value is within one or more of the quantifier value ranges.

3. A method of analyzing and servicing an imaging device comprising:
    receiving data from the imaging device;
    converting the received data into a quantifier value by adding together units of the received data to form the quantifier value;
    determining whether the received data matches existing data by determining whether the quantifier value matches the existing data;
    upon determining that the received data matches the existing data, selecting an action to be taken that correlates with the matched existing data; and
    adding the received data to the existing data.

4. A method of analyzing and servicing an imaging device comprising:
    receiving data from the imaging device;
    determining whether the received data matches existing data;
    upon determining that the received data matches the existing data, selecting an action to be taken that correlates with the matched existing data;
    adding the received data to the existing data;
    receiving feedback regarding a condition of the imaging device and a service action taken to change the condition; and
    correlating the feedback with the received data.

5. A method as defined in claim 4 further comprising:
    converting the received data into a quantifier value;
    and wherein the determining step comprises determining whether the quantifier value matches the existing data.

6. A method of analyzing and servicing imaging devices comprising:
    for each imaging device of at least a portion of the imaging devices, periodically reading object identifiers from the imaging device, calculating a quantifier value from the object identifiers and recording the quantifier value; and
    for at least one of the imaging devices:
    taking action in response to a condition of the imaging device;
    recording the condition and the action taken; and correlating the condition and action taken with a most recent quantifier value for the imaging device recorded prior to taking the action.

7. A method as defined in claim 6 wherein:

each imaging device corresponds to one of a plurality of types of imaging devices;

and further comprising:

for each type of imaging device, indexing the quantifier value to the object identifiers from which the quantifier value was calculated.

8. A method as defined in claim 6 further comprising:

calculating the quantifier value by adding together units of the object identifiers.

9. A method as defined in claim 8 further comprising:

before calculating the quantifier value, converting the units of the object identifiers into a hexadecimal form.

10. A method as defined in claim 6 wherein:

each imaging device corresponds to one of a plurality of types of imaging devices;

and further comprising:

for each type of imaging device, combining quantifier values and correlated conditions and actions taken for each imaging device to form a database of ranges of quantifier values correlated with conditions and actions taken for imaging devices of a same type.

11. A method as defined in claim 10 further comprising:

for each imaging device of the at least a portion of the imaging devices:

after calculating the quantifier values, looking up the quantifier values in the database to find a matching range of quantifier values from the same type of the imaging device; and upon finding a match, taking action according to the condition and action taken corresponding to the matching range of quantifier values.

12. A method as defined in claim 11 further comprising:

upon finding a match, calculating a probability value indicating a degree of confidence that the condition and action taken are a correct condition and action taken.

13. A method as defined in claim 6 wherein:

each imaging device corresponds to one of a plurality of types of imaging devices;

and further comprising:

for each type of imaging device, combining quantifier values and correlated conditions and actions taken for each imaging device to form a database of quantifier values and correlated conditions and actions taken for imaging devices of a same type.

14. A method as defined in claim 13 further comprising:

for each imaging device of the at least a portion of the imaging devices:

after calculating the quantifier values, looking up the quantifier values in the database to find a matching quantifier value from the same type of the imaging device; and upon finding a match, taking action according to the condition and action taken corresponding to the matching quantifier value.

15. A method as defined in claim 6 further comprising:

combining quantifier values and correlated conditions and actions taken to form a database of quantifier values and correlated conditions and actions taken.

16. A method as defined in claim 15 further comprising:

for each imaging device of the at least a portion of the imaging devices:

after calculating the quantifier values, looking up the quantifier values in the database to find a matching quantifier value; and upon finding a match, taking action according to the condition and action taken corresponding to the matching quantifier value.

17. A method as defined in claim 6 further comprising:

for each imaging device of the at least a portion of the imaging devices, dividing the object identifiers from the imaging device into a plurality of sections, and calculating section quantifier values for each section; and for the at least one of the imaging devices, correlating the condition and action taken with at least one most recent section quantifier value for the imaging device recorded prior to taking the action.

18. A method as defined in claim 6 wherein:

the imaging devices are located within an enterprise;

and further comprising:

before calculating the quantifier value, sending the object identifiers outside of the enterprise to an imaging device service center for analysis.

19. An imaging device service system comprising:

an object identifier data input;

a quantifier value calculator connected to the object identifier data input to receive object identifier data from which a quantifier value is calculated;

a database in which quantifier data and action data are stored;

a quantifier value comparator connected to the quantifier value calculator to receive the quantifier value and to the database to receive the quantifier data, the quantifier value comparator comparing the quantifier value with the quantifier data and generating a comparison result; and a workflow action initiator connected to the quantifier value comparator to receive the comparison result and to the database to receive the action data, the workflow action initiator initiating a workflow action according to the comparison result and the action data.

20. An imaging device service system as defined in claim 19 wherein:

the object identifier data is stored in the database indexed by the quantifier data.

21. An imaging device service system as defined in claim 20 further comprising:

a probability value calculator connected to the quantifier value comparator to receive the comparison result and to the database to read preexisting object identifier data, the probability value calculator reading the preexisting object identifier data indexed by the quantifier data according to the comparison result, the probability value calculator calculating a probability value based on the received object identifier data and the preexisting object identifier data, the probability value indicating a degree of confidence that the workflow action is a correct workflow action.

22. An imaging device service system as defined in claim 19 further comprising:

an action feedback data input; and a database generator connected to the quantifier value calculator to receive the quantifier value, to the action feedback data input to receive action feedback data and to the database to store the quantifier data and the action data therein;

and wherein:

the database generator correlates the quantifier value with the action feedback data and adds the quantifier value and the action feedback data to the quantifier data and the action data, respectively, in the database.

23. An imaging device service system as defined in claim 19 further comprising:

a plurality of imaging devices having the object identifier data;

a means for reading the object identifier data from the imaging devices and transferring the object identifier data to the object identifier data input.

24. An imaging device service system comprising:

a means for receiving object identifier data from imaging devices;

a means for quantifying the object identifier data for the imaging devices into current quantifier values;

a means for comparing the current quantifier values with previous quantifier values to find any matches; and a means for generating an action order in response to finding a match between at least one of the current quantifier values and at least one of the previous quantifier values.

* * * * *